United States Patent
Park et al.

(10) Patent No.: US 9,083,037 B2
(45) Date of Patent: Jul. 14, 2015

(54) FUEL CELL INCLUDING CATHODE ELECTRODE USING IRON REDOX COUPLE

(75) Inventors: Kyung-Won Park, Seoul (KR); Sang-Beom Han, Incheon (KR); Young-Woo Lee, Seoul (KR); A-Ra Ko, Pohang Si Gyeongsangbuk-Do (KR); Do-Young Kim, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 178 days.

(21) Appl. No.: 13/817,520

(22) PCT Filed: Aug. 12, 2011

(86) PCT No.: PCT/KR2011/005964
§ 371 (c)(1),
(2), (4) Date: Feb. 18, 2013

(87) PCT Pub. No.: WO2012/023768
PCT Pub. Date: Feb. 23, 2012

(65) Prior Publication Data
US 2013/0157155 A1    Jun. 20, 2013

(30) Foreign Application Priority Data
Aug. 16, 2010 (KR) .................. 10-2010-0078866

(51) Int. Cl.
*H01M 8/20* (2006.01)
*H01M 8/18* (2006.01)
*H01M 8/22* (2006.01)
*H01M 8/04* (2006.01)
*H01M 8/10* (2006.01)
*H01M 4/92* (2006.01)

(52) U.S. Cl.
CPC ............ *H01M 8/20* (2013.01); *H01M 8/04201* (2013.01); *H01M 8/184* (2013.01); *H01M 8/22* (2013.01); *H01M 4/921* (2013.01); *H01M 8/1018* (2013.01); *H01M 2008/1095* (2013.01); *Y02E 60/528* (2013.01)

(58) Field of Classification Search
CPC ...................................................... H01M 8/20
USPC ...................................................... 429/417
See application file for complete search history.

(56) References Cited

FOREIGN PATENT DOCUMENTS

| JP | 2001070748 A | 3/2001 |
|---|---|---|
| JP | 2006210342 A | 8/2006 |
| JP | 2007503705 A | 2/2007 |
| JP | 2007505442 A | 3/2007 |
| JP | 2007250548 A | 9/2007 |
| KR | 1020070053335 A | 5/2007 |

*Primary Examiner* — Kenneth Douyette
*Assistant Examiner* — James Lee
(74) *Attorney, Agent, or Firm* — Novick, Kim & Lee, PLLC; Sang Ho Lee

(57) ABSTRACT

Provided is a fuel cell including an anode electrode, a cathode electrode, and an electrolyte/ion exchange membrane between the anode electrode and the cathode electrode. The cathode electrode uses an iron redox couple as an oxidizer. The iron redox couple is regenerated by an oxidizing substance. The fuel cell does not need a noble metal catalyst, is thus economical in manufacturing costs, and has high power density, thereby improving energy conversion efficiency. Furthermore, the fuel cell is capable of decomposing an oxidizing substance, such as $NO_x$, $Cl_2$, $Br_2$, or $O_3$.

7 Claims, 2 Drawing Sheets

FUEL CELL INCLUDING CATHODE ELECTRODE USING IRON REDOX COUPLE

TECHNICAL FIELD

The present invention relates to a fuel cell including a cathode electrode using an iron redox couple.

BACKGROUND ART

In general, fuel cells are power generation systems that directly convert the chemical reaction energy of hydrogen and oxygen contained in a hydrocarbon-based substance, such as methanol, ethanol, and a natural gas, into electrical energy. Such a fuel cell generally includes an anode electrode to which a fuel is supplied, a cathode electrode to which an oxidizer is supplied, and a cation exchange membrane positioned between the anode electrode and the cathode electrode. In the fuel cell, the oxidizer generally uses oxygen or air.

Much attention has been paid to the fuel cells as systems for clean energy conversion since the fuel cells are highly efficient and discharge/emit a small amount of pollutants. However, the fuel cells have yet to be successfully deployed on a commercial scale since they are expensive and have low technical reliability. In particular, an oxygen-reduction reaction taking place in the cathode electrode ('air electrode' or 'reduction electrode') is about $10^6$ times later than a hydrogen-oxidization reaction taking place in an anode electrode ('fuel electrode' or 'oxidation electrode'). Thus, the oxygen-reduction reaction taking place in the cathode electrode is not only a main factor that determines a total reaction speed but also a main cause that determines the performance of a fuel cell.

To increase the speed of the oxygen-reduction reaction, a platinum catalyst is used in cathode electrodes of most of fuel cells at present. The platinum catalyst has high electrical conductivity and good catalyst characteristics but is expensive and has a limit to increasing a surface area in which a catalytic action takes place. To save manufacturing costs, the platinum content of the cathode electrode may be reduced or a non-noble metal catalyst has been requested to be developed as an alternative catalyst.

To this end, redox fuel cells using various redox couples having high speeds of reaction have been developed. In the redox fuel cells, since a redox couple that is regeneratable is used instead of an anode electrode and a cathode electrode, a kinetic loss is reduced and a noble metal catalyst may not be used. However, a complicated regeneration process, e.g., a microbial process, should be performed to increase the speed of regeneration at present.

DETAILED DESCRIPTION OF THE INVENTION

Technical Problem

The present invention is directed to a fuel cell which has high power density without using a platinum catalyst in a cathode electrode, thus has high energy conversion efficiency, and is capable of decomposing an oxidizing substance, such as $NO_x$, $Cl_2$, $Br_2$, and $O_3$, while converting chemical energy into electrical energy.

Technical Solution

According to one aspect of the present invention, there is provided a fuel cell including an anode electrode, a cathode electrode, and an electrolyte or an ion exchange membrane between the anode electrode and the cathode electrode. The cathode electrode uses an iron redox couple as an oxidizer. Iron (II) ions of the iron redox couple are regenerated by at least one oxidizing substance selected from the group consisting of $NO_x$, $O_3$, $Cl_2$, $Br_2$, $HNO_3$, $HNO_2$, $HClO_4$, $HClO_3$, $HClO_2$, and $HClO$.

Advantageous Effects

A fuel cell according to the present invention does not need a noble metal catalyst, such as a platinum catalyst, is thus economical in manufacturing costs, and has high power density to improve energy conversion efficiency.

Also, the fuel cell is capable of decomposing an oxidizing substance, such as $NO_x$, $Cl_2$, $Br_2$, and $O_3$, by absorbing the oxidizing substance into an iron redox couple without a high-temperature catalytic process while converting chemical energy into electrical energy, and regenerating the iron redox couple.

BEST MODE OF THE INVENTION

In a fuel cell according to the present invention, the oxidizer may include iron sulfate. Also, the ion exchange membrane may be a cation exchange membrane or an anion exchange membrane.

The fuel cell may further include a fuel supply unit configured to supply a fuel, which is used for an oxidization reaction, to the anode electrode. The fuel cell may further include an oxidizer supply unit configured to supply the oxidizer to the cathode electrode.

The oxidizer supply unit may include a pollutant transfer line configured to transfer iron (II) ions, which are reduced in the cathode electrode, to the oxidizer supply unit.

The oxidizing substance may be supplied to the oxidizer supply unit.

Mode of the Invention

Hereinafter, exemplary embodiments of the present invention will be described in detail below with reference to the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those of ordinary skill in the art.

Figure 1:
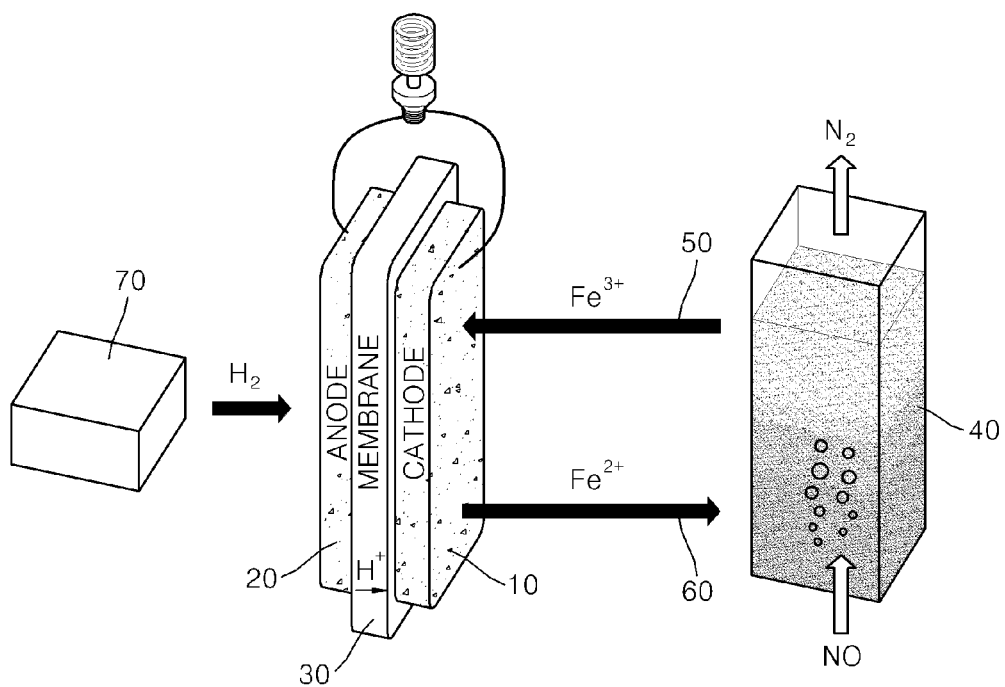
FIG. 1 is a diagram schematically illustrating a structure of a fuel cell according to an embodiment of the present invention.

FIG. 1 is a diagram schematically illustrating a structure of a fuel cell according to an embodiment of the present invention.

Referring to FIG. 1, the present invention is directed to a full cell including a cathode electrode 10, an anode electrode 20, and an electrolyte/ion exchange membrane 30.

When an iron redox couple is supplied as an oxidizer to the cathode electrode 10, a reduction reaction occurs in the cathode electrode 10 and the cathode electrode 10 is then supplied the iron redox couple regenerated using an oxidizing substance (for example, at least one oxidizing substance selected from the oxidizing compound group consisting of $NO_x$, $O_3$, $Cl_2$, $Br_2$, $HNO_3$, $HNO_2$, $HClO_4$, $HClO_3$, $HClO_2$, and $HClO$).

More specifically, as expressed in Formulae 1 to 6 below, during the reduction reaction occurring in the cathode electrode 10, iron (III) ions are reduced in the cathode electrode 10 to generate iron (II) ions. The iron (II) ions absorb an oxidizing compound (especially, $NO_x$, $Cl_2$, $Br_2$, or $O_3$ which is an oxidizing pollutant) to be regenerated as iron (III) ions. Then, the regenerated iron (III) ions are supplied to the cathode electrode 10.

$$Fe^{3+}+e^- \leftrightarrow Fe^{2+} \quad \text{<Formula 1>}$$

$$4Fe^{2+}+2NO+4H^+ \leftrightarrow 4Fe^{3+}+N_2+2H_2O \quad \text{<Formula 2>}$$

$$8Fe^{2+}+2NO_2+8H^+ \leftrightarrow 8Fe^{3+}+N_2+4H_2O \quad \text{<Formula 3>}$$

$$6Fe^{2+}+O_3+6H^+ \leftrightarrow 6Fe^{3+}+3H_2O \quad \text{<Formula 4>}$$

$$2Fe^{2+}+Cl_2+2H^+ \leftrightarrow 2Fe^{3+}+2HCl \quad \text{<Formula 5>}$$

$$2Fe^{2+}+Br_2+2H^+ \leftrightarrow 2Fe^{3+}+2HBr \quad \text{<Formula 6>}$$

By using the reduction reaction and the regeneration process of the iron redox couple taking place in the cathode electrode 10, a standard potential of 0.77 V may be stably obtained through the reduction reaction. Since the activation energy of the iron redox couple is very low, the speed of the reduction reaction and the speed of decomposing the oxidizing substance in the cathode electrode 10 may increase. Also, since the activation energy of the iron redox couple is very low, the energy conversion efficiency of the fuel cell may be increased in the cathode electrode 10 without using a noble metal catalyst. Furthermore, the iron (II) ions may be regenerated without a catalytic process or a microbial process and the regeneration process of the oxidizer may be more simplified, due to a high speed of reaction of the oxidizing substance ($NO_x$, $Cl_2$, $Br_2$, or $O_3$) and the iron (II) ions.

The oxidizer supplied to the cathode electrode 10 provides a redox couple of iron ions, and may be obtained using a compound having a high absorption ratio with respect to the oxidizing substance. More specifically, iron sulfate [$Fe_2(SO_4)_3$, $Fe(SO_4)$] may be used. The oxidizer may be formed using a saturated aqueous solution or 1 to 2 moles of an aqueous solution.

The cathode electrode 10 includes a substrate. The substrate supports the cathode electrode 10, and accelerates the diffusion of the oxidizer, thereby accelerating the reduction reaction in the cathode electrode 10.

The substrate may be, for example, carbon paper, carbon cloth, carbon felt, metal cloth (a porous film formed of metal cloth having a fiber state or a metal film formed at a surface of cloth formed of polymer fiber), or the like.

Alternatively, the cathode electrode 10 may further include a catalyst layer. The type of a catalyst of the catalyst layer is not limited if the catalyst is generally used in the technical field to which the present invention pertains. Examples of a catalyst may be explained when the anode electrode 20 is described below. Preferably, a platinum catalyst may be used. When the catalyst layer is formed, the content of the platinum catalyst which is expensive may be reduced or another inexpensive catalyst may be used.

The fuel cell according to the present embodiment may further include an oxidizer supply unit 40. The oxidizer supply unit 40 is configured to store the oxidizer and supply the oxidizer to the cathode electrode 10. When the oxidizing substance is supplied to the cathode electrode 10, the iron (II) ions reduced in the cathode electrode 10 absorb and decompose the oxidizing substance, and are then oxidized. The oxidizer supply unit 40 may further add a ligand, such as $SO^{4-}$, $PO^{4-}$, $Cl^-$, or $I^-$, to increase the absorption ratio of the iron (II) ions with respect to the oxidizing substance.

In the oxidizer supply unit 40, the oxidizer, i.e., the iron (II) ions, may be regenerated as iron (III) ions by at least one oxidizing substance selected from the group consisting of $NO_x$ (a nitrogen oxide, NO, $NO_2$, etc.), $O_3$, $Cl_2$, $Br_2$, $HNO_3$, $HNO_2$, $HClO_4$, $HClO_3$, $HClO_2$, and $HClO$.

The oxidizer supply unit 40 includes a transfer line 50 via which that oxidizer is transferred to the cathode electrode 10, and a pollutant supply line 60 via which the iron (II) ions reduced in the cathode electrode 10 are transferred to the oxidizer supply unit 40. The oxidizing substance, the oxidizer, and the like may also be transferred via a transfer device, e.g., a pump, which is used in general fuel cells. In the anode electrode 20, an oxidizing reaction of a fuel occurs. The fuel may be either gaseous or liquid hydrogen that is usually used in this art, or a hydrocarbon fuel. The hydrocarbon fuel may be methanol, ethanol, propanol, butanol, a natural gas, or the like.

The anode electrode 20 includes a substrate. The substrate supports the anode electrode 20, and helps diffuse the fuel into the catalyst layer so that the fuel may easily be supplied to the catalyst layer. The substrate may be the same as that included in the cathode electrode 10 but is not limited thereto.

The anode electrode 20 may include a catalyst layer. The catalyst layer helps an oxidization reaction to be efficiently performed in the anode electrode 20. The catalyst of the catalyst layer may be a platinum-based catalyst. The platinum-based catalyst may include one selected from the group consisting of platinum, ruthenium, osmium, a platinum-ruthenium alloy, a platinum-osmium alloy, a platinum-palladium alloy, a platinum-M alloy ('M' denotes a transition metal selected from the group consisting of Ga, Ti, V, Cr, Mn, Fe, Co, Ni, Cu, Zn, Sn, Mo, W, Rh, Rh and a combination thereof), and a mixture thereof.

Preferably, the platinum-ruthenium alloy may be used as the catalyst to prevent catalyst poisoning from occurring due to CO generated during a reaction process in the anode electrode 20.

The platinum-ruthenium alloy (platinum-based alloy) may be one selected from Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, and Pt/Ru/Sn/W, and a mixture thereof.

The fuel cell according to the present embodiment may further include a fuel supply unit 70. The fuel supply unit 70 is configured to supply a fuel to the anode electrode 20. Alternatively, the fuel may be supplied via a well-known transfer device, e.g., a pump.

The electrolyte/ion exchange membrane 30 is placed between the cathode electrode 10 and the anode electrode 20.

The electrolyte/ion exchange membrane 30 not only functions as an insulator that electrically isolates the anode electrode 20 and the cathode electrode 10 from each other, but also functions as a medium via which hydrogen ions or hydroxyl ions are delivered from the anode electrode 20 to the cathode electrode 10 during an operation of the fuel cell. At the same time, the electrolyte/ion exchange membrane 30 separates the oxidizer or the fuel.

The electrolyte means a material having ion conductivity that may be used in various fuel cells, e.g., hydroxyl ions, phosphate, molten carbonate, solid oxide, or a polyelectrolyte. Preferably, the electrolyte may be an electrolyte having good ion conductivity.

A cation exchange membrane or an anion exchange membrane may be used as the ion exchange membrane 30.

Specifically, the cation exchange membrane may be formed using at least one selected from a fluorine-based polymer, a benzimidazole-based polymer, a polyimide-based polymer, a polyetherimide-based polymer, a polyphenylene sulfide-based polymer, a polysulfone-based polymer, a polyethersulfone-based polymer, a polyetherkethone-based polymer, a polyether-etherkethone-based polymer, and a polyphenylquinoxaline-based polymer.

Specifically, the anion exchange membrane may be selected from a fluorine-based polymer or a hydrocarbon-based polymer and electrolytes containing a functional group which have positive ions capable of causing hydroxyl ions to be moved well.

In the fuel cell according to the present embodiment, the electrolyte/ion exchange membrane 30 may include an ion transfer layer to secure appropriate electrical conductivity.

The fuel cell according to the present embodiment may be fabricated according to any of various known methods. For example, the catalyst layer may be formed using a spraying method, a painting method, an electrical deposition method, or spin coating. The cathode electrode 10, the anode electrode 20, and the electrolyte/ion membrane 30 may be bound together by applying high temperature and high pressure, but the present invention is not limited thereto.

A plurality of fuel cells according to the present embodiment may be connected if necessary.

Exemplary embodiments of the present invention will now be described in greater detail below.

The following embodiments are just examples provided to explain the present invention and are not intended to restrict the scope of the present invention.

FIRST EXAMPLE

Manufacture of Fuel Cell (1) Forming of Electrodes

Catalytic slurry was formed by adding 5% of a Nafion solution (Nafion™, which is commercially available from DuPont) carbon black (Pt/Vulcan XC72R, which is commercially available from Basf) supported with 20% of platinum, as a catalyst such that a weight ratio of the catalyst and the Nafion solution was 80:20, and adding ultrapure water and isopropyl alcohol of 30 parts by weight based on 100 parts by weight of the catalyst. Then, the catalytic slurry was applied on carbon paper (which is commercially available from Torray) such that the content of platinum was 0.5 mg/cm$^2$, thereby forming an anode electrode.

Then, a cathode electrode was manufactured using carbon black that was not supported with platinum, as a catalyst, according to the method of forming the anode electrode. Then, catalytic slurry was applied on carbon paper (which is commercially available from Torray) such that the content of the carbon black catalyst was 1 mg/cm$^2$, thereby manufacturing the cathode electrode.

Nafion 212 (which is commercially available from DuPont) serving as a cation exchange membrane was placed between the cathode electrode and the anode electrode which are manufactured by the method described above, and then was thermally compressed for about three minutes while applying pressure of 100 kg/cm$^2$ thereon at 120° C., thereby manufacturing a full cell as shown in FIG. 1.

(2) Forming of Oxidizer

Figure 2:
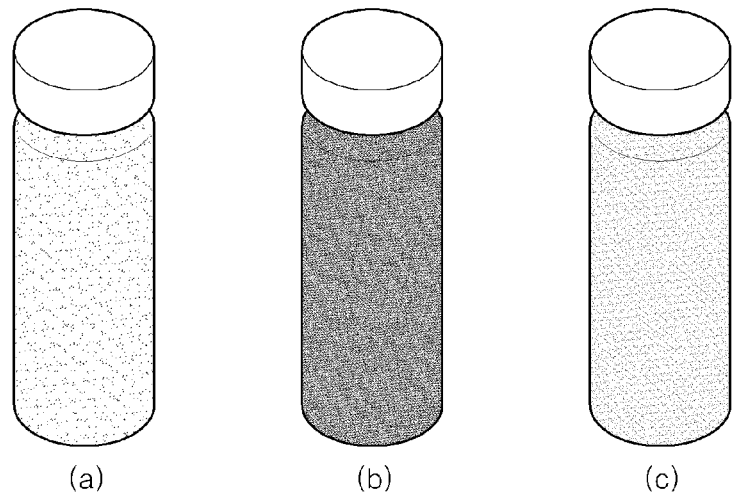
FIG. 2 illustrates images showing color changes, caused by oxidization/reduction of an oxidizer or decomposing of an oxidizing substance according to an embodiment of the present invention.

In order to form an oxidizer to be supplied to the cathode electrode of the fuel cell, a (1M FeSO$_4$+2M H$_2$SO$_4$) solution was produced. The produced solution was an azure solution. A saturated solution was produced by absorbing 5% of NO gas into the produced solution for one hour. Referring to FIG. 2, the azure solution (a) was changed into a dark brown solution (b) when the NO gas was absorbed into the azure solution (a), and the dark brown solution (b) was changed into a yellow solution (c) when the dark brown solution (b) was left at normal temperature for twenty-four hours.

The azure solution (a) exhibits the properties of iron (II) ions of FeSO$_4$. The dark brown solution (b) exhibits the color of Fe(NO)SO$_4$ obtained when the NO gas was absorbed into FeSO$_4$. The yellow solution (c) exhibits the color when iron (III) ions are formed. Referring to the solutions (a) to (c), the NO gas was decomposed to regenerate the iron (II) ions as the iron (III) ions.

FIRST EXPERIMENTAL EXAMPLE

Hydrogen was supplied to the anode electrode of the fuel cell according to the first example at 27 ml/min, and the yellow solution (c) according to the first example was supplied to the cathode electrode of the fuel cell at 2 ml/min.

Figure 3:
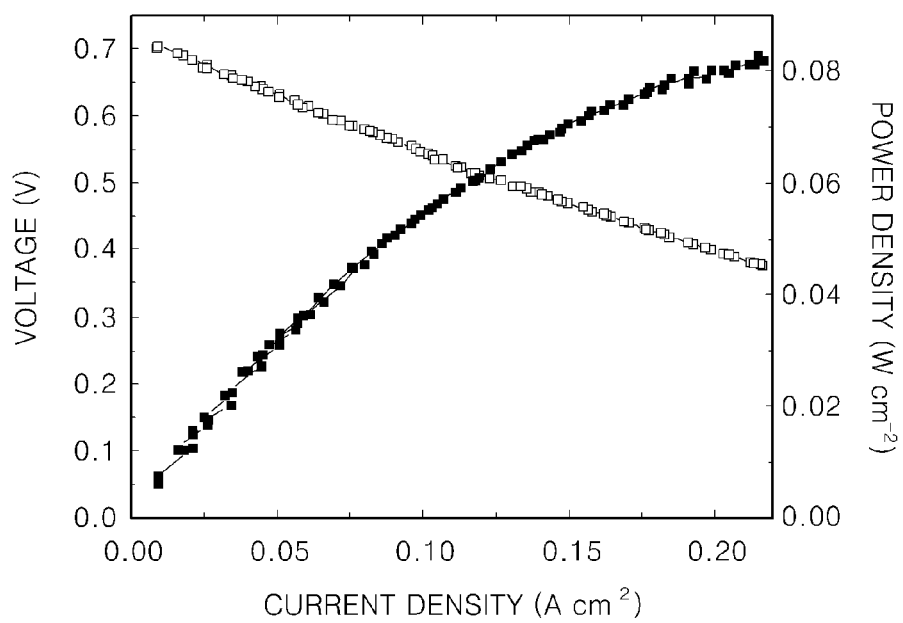
FIG. 3 is a graph illustrating current density of a fuel cell according to an embodiment of the present invention.

In this case, an active area of a unit cell was 2 cm$^2$, and current density (fuel cell station-CNL energy) was measured at 80° C. under normal pressure (see FIG. 3).

A fuel cell according to the present invention uses an iron redox couple as an oxidizer and thus has high current density and good energy conversion efficiency. In the fuel cell according to the present invention, an oxidizing gas, such as NO$_x$, Cl$_2$, Br$_2$, or O$_3$, is absorbed and decomposed by the iron redox couple while chemical energy is converted into electrical energy, and the iron redox couple is regenerated.

While the present invention has been particularly shown and described with reference to exemplary embodiments thereof, it will be understood by those of ordinary skill in the art that various changes in form and details may be made therein without departing from the spirit and scope of the invention as defined by the appended claims.

INDUSTRIAL APPLICABILITY

A fuel cell according to the present invention has high power density without using a platinum catalyst in a cathode electrode and thus has high energy conversion efficiency. Also, the fuel cell is capable of decomposing an oxidizing substance, such as NO$_x$, Cl$_2$, Br$_2$, or O$_3$, while converting chemical energy into electrical energy.

The invention claimed is:

1. A fuel cell including an anode electrode, a cathode electrode, and an electrolyte or an ion exchange membrane between the anode electrode and the cathode electrode, wherein the cathode electrode uses an iron redox couple as an oxidizer, and
   iron (II) ions of the iron redox couple are regenerated by at least one oxidizing substance selected from the group consisting of NO$_x$, O$_3$, Cl$_2$, Br$_2$, HNO$_3$, HNO$_2$, HClO$_4$, HClO$_3$, HClO$_2$, and HClO.

2. The fuel cell of claim 1, wherein the oxidizer comprises iron sulfate.

3. The fuel cell of claim 1, wherein the ion exchange membrane is a cation exchange membrane or an anion exchange membrane.

4. The fuel cell of claim 1, further comprising a fuel supply unit configured to supply a fuel to the anode electrode.

5. The fuel cell of claim 1, further comprising an oxidizer supply unit configured to supply the oxidizer to the cathode electrode.

6. The fuel cell of claim 5, further comprising a pollutant transfer line via which the oxidizer supply unit transfers iron (II) ions reduced in the cathode electrode to the oxidizer supply unit.

7. The fuel cell of claim 5, wherein the oxidizing substance is supplied to the oxidizer supply unit.

* * * * *